(12) United States Patent
Tochihara et al.

(10) Patent No.: US 6,773,101 B2
(45) Date of Patent: Aug. 10, 2004

(54) INK-JET RECORDING SYSTEM AND INK-JET RECORDING METHOD

(75) Inventors: Shinichi Tochihara, Kanagawa (JP); Yuji Kondo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,762

(22) Filed: Aug. 22, 2001

(65) Prior Publication Data

US 2002/0044186 A1 Apr. 18, 2002

(30) Foreign Application Priority Data

Aug. 23, 2000 (JP) ........................................ 2000-252416

(51) Int. Cl.$^7$ ................................................. B41J 2/01
(52) U.S. Cl. ........................ 347/100; 347/101; 347/105; 347/95
(58) Field of Search ........................... 347/100, 95, 105, 347/96, 101; 428/195; 106/31.13, 31.6, 31.27, 100, 105, 101, 31–38

(56) References Cited

U.S. PATENT DOCUMENTS

| | | | |
|---|---|---|---|
| 4,202,870 A | | 5/1980 | Weber et al. |
| 4,242,271 A | | 12/1980 | Weber et al. |
| 5,160,370 A | | 11/1992 | Suga et al. |
| 5,538,549 A | * | 7/1996 | Kato et al. ................. 347/100 |
| 5,619,315 A | * | 4/1997 | Kusumoto et al. ........... 399/324 |
| 5,635,291 A | | 6/1997 | Yoshino et al. ............ 428/304.4 |
| 5,679,451 A | | 10/1997 | Kondo et al. ............. 428/304.4 |
| 5,734,403 A | * | 3/1998 | Suga et al. ................. 347/100 |
| 5,764,263 A | * | 6/1998 | Lin ............................ 347/101 |
| 5,846,647 A | | 12/1998 | Yoshino et al. ............. 428/328 |
| 5,955,185 A | | 9/1999 | Yoshino et al. ........... 428/304.4 |
| 5,962,124 A | * | 10/1999 | Yoshino et al. ............. 428/195 |
| 6,000,794 A | * | 12/1999 | Kondo et al. ............... 347/105 |
| 6,143,807 A | * | 11/2000 | Lin et al. ................. 106/31.65 |
| 6,166,122 A | * | 12/2000 | Tanuma et al. .............. 524/430 |
| 6,177,188 B1 | | 1/2001 | Ichioka et al. .............. 428/342 |
| 6,238,047 B1 | | 5/2001 | Suzuki et al. |
| 6,342,289 B1 | * | 1/2002 | Eguchi et al. ............... 428/195 |
| 6,485,812 B1 | * | 11/2002 | Sekiguchi ................... 428/195 |

FOREIGN PATENT DOCUMENTS

| | | | | |
|---|---|---|---|---|
| JP | 2-255875 | | 10/1990 | |
| JP | 4-57859 | | 2/1992 | |
| JP | 4-57860 | | 2/1992 | |
| JP | 5-125437 | | 5/1993 | |
| JP | 5-125438 | | 5/1993 | |
| JP | 5-125439 | | 5/1993 | |
| JP | 6-99656 | | 4/1994 | |
| JP | 7-232475 | | 9/1995 | |
| JP | 08-132731 | * | 5/1996 | ............ B41M/5/00 |
| JP | 9-123593 | | 5/1997 | |
| JP | 09-188064 | * | 7/1997 | ............ B41M/5/00 |
| JP | 10-67168 | | 3/1998 | |
| JP | 10-119422 | | 5/1998 | |

* cited by examiner

*Primary Examiner*—Stephen D. Meier
*Assistant Examiner*—Manish Shah
(74) *Attorney, Agent, or Firm*—Fitzpatrick, Cella, Harper & Scinto

(57) ABSTRACT

Disclosed herein is an ink-jet recording system which employs an ink-jet recording apparatus including a recording-medium-holding part for a recording medium having an ink-receiving layer on a base material and an ink-holding part for a pigment ink to record an image on the ink-receiving layer of the recording medium fed from the recording-medium-holding part using the pigment ink fed from the ink-holding part, wherein (1) the ink-receiving layer of the recording medium is a porous layer comprising alumina hydrate and a resin binder and has a pore volume ranging from 0.1 to 1.0 ml/g; and
(2) the pigment ink comprises an aqueous medium, a resin and a pigment, the particle diameter of the pigment substantially falls within a range of from 10 to 500 nm, and the proportion of the pigment particles having a particle diameter of 300 to 500 nm is at most 30% based on the total number of particles of the pigment.

9 Claims, No Drawings

INK-JET RECORDING SYSTEM AND INK-JET RECORDING METHOD

BACKGROUND OF THE INVENTION

1. Field of the Invention

The present invention relates to a pigment ink which gives excellent full-color images, an ink-jet recording system using a recording medium and an ink-jet recording method.

2. Related Background Art

With the advent in recent years of color printers and the development of software for personal computers, which are capable of processing color images, there is an increasing demand for providing higher-definition full-color images. Therefore, developments of high-resolution printing heads, special media for ink-jet, which are high in glossiness, whiteness degree and absorbency, etc. are advancing rapidly. Since an ink-jet printing system is a non-contact printing system, plate-making is not required, and high-speed printing becomes feasible. Therefore, the ink-jet printing system is expected to be used in an increasing number of industrial applications.

Many attempts to use pigments as coloring materials for inks in ink-jet recording have been recently made. The reason is that pigments are the best materials for imparting fastness properties such as water fastness and light fastness in an ink-jet system. Such ink-jet inks using such pigments are disclosed as water-based pigment inks satisfying basic properties such as print quality, ejection stability, shelf stability, resistance to clogging and fixing ability in Japanese Patent Application Laid-Open Nos. 2-255875, 6-99656, 4-57859 and 4-57860.

When it is intended to provide a high-definition full-color image with pigment inks, however, sufficient coloring ability is not achieved when plain paper is used. Therefore, such special media for ink-jet as described above must be selected under the circumstances.

In the industrial applications, base materials having no ink absorbency are often used for ink-jet recording. In such a case, an ink-receiving layer must be coated on such a base material to use it.

However, since most of such ink-receiving layers for ink-jet recording have been developed as special media for ink-jet printers using the conventional dye inks, their suitability for pigment inks is not considered. In glossy media in particular, a highly-absorbable water-soluble resin is often used as a main component for their ink-receiving layers. Such an ink-receiving layer involves a disadvantage that the ink-receiving layer itself has no water resistance, namely, that even when a pigment with good water resistance is used, the pigment runs out together with the ink-receiving layer, since the ink-receiving layer is soluble in water. Further, in an image portion formed with the pigment ink, a problem of rub-off resistance, more specifically, a problem arises that when the image portion is touched or rubbed with a finger, the color of the image is simply faded, or the image is stained. This phenomenon is particularly marked at a mixed-color portion of the color image in which the amount of inks applied is increased.

As a current means for solving such a problem as described above, the whole surface of the recording medium with the color image is subjected to a post-treatment such as a laminating treatment. However, such a treatment is not always satisfactory from the viewpoints of cost, workability and the like, and it is desired that it shall be improved.

Some proposals have been made on ink-jet recording media for pigment inks. For example, Japanese Patent Application Laid-Open No. 9-123593 discloses that ink-jet recording is conducted with pigment inks on a highly-absorbable water-soluble receiving layer provided on a porous layer of alumina hydrate as an ink-jet recording medium for pigment inks. However, water among components of the pigment inks applied is absorbed into the porous layer of alumina hydrate, but pigments themselves are fixed to the water-soluble resin layer which is the uppermost layer. Therefore, such a problem of water fastness as described above remains unsolved after all. Japanese Patent Application Laid-Open No. 10-119422 discloses that ink-jet recording is conducted with pigment inks on a carboxylated SBR resin layer provided on a porous layer containing alumina hydrate or silica. Since the carboxylated SBR resin layer is an ink-receiving layer with good affinity for non-aqueous inks, satisfactory suitability for water-based pigment inks is not to be expected. Japanese Patent Application Laid-Open No. 10-67168 discloses that a porous layer containing silica or alumina is provided on a base material (cellulose paper, synthetic paper or the like) having porosity and ink-jet recording is conducted with pigment inks thereon. However, the structure of the base material is limited to that having porosity in which liquid components in the inks can be absorbed. In addition, image properties when a full-color image, in which the amount of inks applied increases, is recorded, particularly, rub-off resistance at an image portion, and the like-are not known.

In any event, under the circumstances, sufficient investigations have not been made on a pigment ink for ink-jet recording and optimization of an ink-receiving layer in and to which the ink is absorbed and fixed.

SUMMARY OF THE INVENTION

Accordingly, it is an object of the present invention to provide an ink-jet recording system and method using pigment inks and a recording medium, by which good coloring ability and ink absorbency are achieved when a high-definition full-color image is formed with pigment inks of plural colors, and moreover an ink-jet color recorded article having improved rub-off resistance and water fastness at an image portion thereof is provided.

The above object can be achieved by the present invention described below.

According to the present invention, there is thus provided an ink-jet recording system which employs an ink-jet recording apparatus comprising a recording-medium-holding part for a recording medium having an ink-receiving layer on a base material and an ink-holding part for a pigment ink to record an image on the ink-receiving layer of the recording medium fed from the recording-medium-holding part using the pigment ink fed from the ink-holding part, wherein (1) the ink-receiving layer of the recording medium is a porous layer comprising alumina hydrate and a resin binder and has a pore volume ranging from 0.1 to 1.0 ml/g; and (2) the pigment ink comprises an aqueous medium, a resin and a pigment, the particle diameter of the pigment substantially falls within a range of from 10 to 500 nm, and the proportion of the pigment particles having a particle diameter of 300 to 500 nm is at most 30% based on the total number of particles of the pigment.

According to the present invention, there is also provided an ink-jet recording method comprising conducting ink-jet recording on a recording medium having an ink-receiving layer on a base material using a pigment ink to form an image, wherein (1) the ink-receiving layer is a porous layer comprising alumina hydrate and a resin binder and has a pore volume ranging from 0.1 to 1.0 ml/g; and
(2) the pigment ink comprises an aqueous medium, a resin and a pigment, the particle diameter of the pigment substantially falls within a range of from 10 to 500 nm, and the proportion of the pigment particles having a particle diameter of 300 to 500 nm is at most 30% based on the total number of particles of the pigment.

DESCRIPTION OF THE PREFERRED EMBODIMENTS (Recording Medium)

As the base material used in the present invention, may be used paper such as suitably sized paper, water leaf paper or resin-coated paper, or a film or sheet of a resin. However, the base material is not particularly limited thereto, As the base material formed from a resin, may be used a transparent film such as a film of polyesters, polystyrene, polyvinyl chloride, polymethyl methacrylate, cellulose acetate, polyethylene or polycarbonate, or an film or sheet opacified by filling of alumina hydrate, titanium white or the like, or by foaming.

In order to improve adhesion to the ink-receiving layer, the surface of the base material may be subjected to a surface treatment such as a corona discharge treatment, or an easy-adhesion layer may be provided as an undercoat on the surface. Further, a curl-preventing layer such as a resin layer or a pigment layer for preventing curling may be provided on the back surface of the base material or at a desired position thereof.

No particular limitation is imposed on the alumina hydrate used in the formation of the ink-receiving layer so far as the object of the present invention can be achieved. For example, that having the general formula

$Al_2O_{3-n}(OH)_{2n} \cdot mH_2O$ wherein n is 0, 1, 2 or 3, and m is a number ranging from 0 to 10, preferably from 0 to 5. In many cases, $mH_2O$ represents an aqueous phase that does not participate in the formation of a crystal lattice, but is able to be eliminated. Therefore, m may take another value than an integer and reaches 0 when such an alumina hydrate is calcined. However, m and n are not 0 at the same time. As the alumina hydrate, a non-crystalline alumina hydrate, particularly, an alumina hydrate described in Japanese Patent Application Laid-Open No. 5-125437, 5-125438, 5-125439 or 7-232475 is preferred. Whether the alumina hydrate is non-crystalline or not can be identified by analysis by X-ray diffractometry, or the like.

The alumina hydrate is mixed with a resin binder, which will be described subsequently, directly or in the form dispersed in water or a liquid medium composed mainly of water, and used in the formation of the ink-receiving layer. The alumina hydrate is contained in the ink-receiving layer, whereby a porous structure can be imparted to the ink-receiving layer.

The porous structure of the ink-receiving layer can be characterized by, for example, the pore volume or BET specific surface area thereof. The pore volume of the ink-receiving layer falls within a range of from 0.1 to 1.0 ml/g from the viewpoint of achieving the object of the present invention.

If the pore volume is greater than the upper limit of the above range, cracking and dusting may tend to occur on the ink-receiving layer, and pigment particles excessively penetrate into the ink-receiving layer in a vertical direction to lower the density and saturation of the resulting image in some cases though the rub-off resistance of the image can be improved. If the pore volume is smaller than the lower limit of the above range, sufficient ink absorbency cannot be achieved in the resulting ink-receiving layer, so that when multi-color printing is conducted in particular, inks may run out of the ink-receiving layer to cause bleeding on an image formed in some cases.

In the case of a pigment ink in particular, the pigment is present in a state of a great number of particles having a particle diameter distribution, unlike a dye. Therefore, causing these pigment particles to penetrate voids in the ink-absorbing layer to some extent becomes a useful means for improving the rub-off resistance. Even from this point of view, it is strongly desired that the pore volume shall be at least 0.1 ml/g.

The BET specific surface area of the ink-receiving layer is preferably within a range of from 20 to 450 $m^2/g$. If the BET specific surface area is smaller than the lower limit of the above range, sufficient glossiness may not be achieved in such an ink-receiving layer, and its haze may increase, so that an image formed thereon may tend to have a white haze. If the BET specific surface area is greater than the upper limit of the above range, such an ink-receiving layer may readily undergo cracking in some cases.

In order to obtain an ink-receiving layer having such preferred pore volume and BET specific surface area, it is preferred that the pore volume of the alumina hydrate fall within a range of from 0.1 to 1.0 ml/g, and its BET specific surface area be within a range of from 40 to 500 $m^2/g$. Incidentally, the physical properties of the alumina hydrate, such as pore volume, may be controlled in the course of its production.

The alumina hydrate is preferably in the form of porous particles, and the particle diameter thereof is preferably 20 to 500 nm. If alumina hydrate having a particle diameter smaller than the lower limit of the above range is used, the resulting ink-receiving layer may become cracked easily in some cases. If alumina hydrate having a particle diameter greater than the upper limit of the above range is used, the surface smoothness of the resulting ink-receiving layer is lowered, and an optical image formed thereon may become whitish as a whole in some cases.

No particular limitation is imposed on the resin binder used in the formation of the ink-receiving layer in the present invention so far as it is a resin satisfying a function as a binder, and examples of such a resin include polyvinyl pyrrolidone, polyvinyl alcohol, carboxymethyl cellulose, acrylic resins, polyurethanes, polyvinyl chloride, polyolefins, polyvinyl acetate, styrene-acrylic copolymers, ethylene-vinyl acetate copolymers and polyvinyl butyral, These binder resins may be used either singly or in any combination thereof. The selection of a hydrophobic resin as the binder resin permits greatly improving the water resistance of the resulting ink-receiving layer.

When a resin emulsion is used as the resin binder, for example, a resin emulsion the lowest film-forming temperature of which falls within a range of from 0 to 50° C., the glass transition temperature of the dispersed resin of which falls within a range of from 0 to 90° C. is preferred.

If the lowest film-forming temperature or the glass transition temperature is lower than the lower limit of the above each range, the pore volume of the resulting ink-receiving layer may decrease as the time goes on after the formation of the ink-receiving layer, and in some cases, the ink-receiving layer may involve such problems that the ink absorbency is deteriorated, the surface becomes sticky, and the surface hardness is lowered to become easy to be damaged.

If the lowest film-forming temperature or the glass transition temperature is higher than the upper limit of either of the above ranges, on the other hand, problems such as deformation of the base material may arise in a heating and drying temperature range necessary for sufficient film formation. More specifically, film-forming ability by fusion bonding among emulsion particles is lowered in drying (under heat) at a low temperature at which the base material is not deformed, which may cause such problems that cracking occurs on the resulting ink-receiving layer, and pores having a large diameter are formed, so that an image formed on the ink-receiving layer tends to have a white haze as a whole.

On the other hand, the particle diameter of the resin particles dispersed in the emulsion preferably falls within a range of, for example, from 0.07 to 0.7 $\mu$m. If the particle diameter is smaller than the lower limit of the above range, the formation of good pores may not be achieved in some cases. If the particle diameter is greater than the upper limit of the above range on the other hand, the diameter of pores formed becomes too large, which may cause a problem that an image formed on the resulting ink-receiving layer tends to have a white haze as a whole.

A mixing ratio by weight of the alumina hydrate to the binder resin (solids in the resin emulsion) is preferably 1/1, more preferably 2/1 in terms of the lower limit, and preferably 9/1, more preferably 7/1 in terms of the upper limit.

If the amount of the binder resin is less than the lower limit of the above range, problems such as lowering of mechanical strength of the resulting ink-receiving layer, occurrence of cracking and dusting may arise in some cases. If the amount is greater than the upper limit of the above range, any ink-receiving layer having sufficient porous structure, for example, pore volume may not be obtained, resulting in a recording medium with poor ink absorbency.

To a coating formulation for the ink-receiving layer, may be added another pigment than the alumina hydrate, for example, at least one of inorganic pigments such as calcium carbonate, kaolin, talc, calcium sulfate, barium sulfate, titania, zinc oxide, zinc carbonate, aluminum silicate, silicic acid, sodium silicate, magnesium silicate, calcium silicate and silica, and organic pigments such as plastic pigments and urea resin pigments as needed.

To the coating formulation, may also be added a water-soluble polymer as needed. Examples of the water-soluble polymer include polyvinyl alcohol and modified products thereof (cationically modified, anionically modified and silanol modified products, etc.), starch and modified products thereof (oxidized and etherified products), gelatin and modified products thereof, casein and modified products thereof, gum arabic, cellulose derivatives such as carboxymethyl cellulose, hydroxyethyl cellulose and hydroxypropylmethyl cellulose, polyvinyl pyrrolidone, maleic anhydride polymers and copolymers thereof, and acrylic ester copolymers. These polymers may be used either singly or in any combination thereof.

To the coating formulation, a dispersant, thickener, pH adjustor, lubricant, flowability modifier, surfactant, anti-foaming agent, water-proofing agent, foam suppressor, releasing agent, mildewproofing agent and/or the like may be further added within limits not impeding the object of the present invention.

The coating of the coating formulation to the base material can be conducted by a method using a blade coating system, air-knife coating system, roll coating system, flash coating system, gravure coating system, kiss coating system, die coating system, extrusion system, slide hopper (slide beat) system, curtain coating system, spray coating system or the like.

The coating weight of the coating formulation on the base material is preferably, in terms of dry solids content, 0.5 g/m$^2$, more preferably 5 g/m$^2$ for the lower limit, and 60 g/m$^2$, more preferably 45 g/m$^2$ for the upper limit. The thickness of the ink-receiving layer may be suitably selected as necessary for the end application desired. In order to achieve better ink absorbency, however, the thickness is preferably at least 15 $\mu$m, more preferably at least 20 $\mu$m. The upper limit thereof may preferably be determined in view of the production efficiency of the ink-receiving layer, and the like.

(Water-based Pigment Ink)

The particle diameter of a pigment dispersed in the water-based pigment ink according to the present invention substantially falls within a range of from 10 to 500 nm, and the proportion of the pigment particles having a particle diameter of 300 to 500 nm is at most 30% based on the total number of particles of the pigment.

If pigment particles having a particle diameter greater than 500 nm are present at such a level as to be detected by a general particle diameter distribution meter, or pigment particles having a particle diameter ranging from 300 to 500 nm are present in a proportion higher than 30% based on the total number of particles of the pigment, such pigment particles are unlikely to penetrate into voids in the porous ink-receiving layer of the recording medium used in the present invention, so that the amount of the pigment particles remaining on the surface of the ink-receiving layer is increased. As a result, a problem of rub-off resistance that when an image formed on the ink-receiving layer with such an ink is lightly touched or rubbed with a finger, the color of the image is faded, or the image is stained, becomes recognizable.

In the water-based pigment inks according to the present invention, a resin component is contained. The problem of the rub-off resistance that occurs due to the causes described above is improved by defining the preferred particle diameter of the pigment particles in the present invention. However, it is impossible to make all the pigment particles penetrate into voids under any conditions. Therefore, a sufficient effect may not be always achieved in some cases. Accordingly, the resin component having film-forming ability for fixing the pigment is contained in an ink in the present invention to fix the pigment remaining on the surface of the ink-receiving layer by this resin after drying.

No particular limitation is imposed on the resin used in the pigment inks according to the present invention so far as a film can be formed as fast as possible after drying. Examples of the water-soluble resin include homopolymers of hydrophilic monomers and salts thereof. In addition, polyvinyl pyrrolidone, polyvinyl alcohol, carboxymethyl cellulose, naphthalenesulfonic acid-formaldehyde condensates, and natural resins such as rosin and shellac may also be used. In the present invention, those having a mass average molecular weight ranging from 1,000 to 15,000 among these water-soluble resins are preferably used.

Specific examples of water-soluble resins, which can also be used as a dispersing agent for pigments, include the following resins, namely, block copolymers and random copolymers composed of at least two components selected from among styrene, styrene derivatives, vinylnaphthalene derivatives, aliphatic alcohol esters of α,β-ethylenically unsaturated carboxylic acids, acrylic acid and derivatives thereof, maleic acid and derivatives thereof, itaconic acid and derivatives thereof, and fumaric acid and derivatives thereof, and salt of these copolymers.

These water-soluble resins are alkali-soluble resins which dissolve in an aqueous solution of a base, and are particularly preferred in that the viscosity of the resulting dispersion can be made lower in the case where they are used in inks for ink-jet, and dispersing operation also becomes easier.

Further, a dispersion with a water-insoluble resin dispersed in a medium comprising water as a main component, for example, any of homopolymer or copolymer resin emulsions or microemulsions of an acrylic ester type, methacrylic ester type, styrene type, styrene-acrylic copolymer, olefin type and monomers having a hydrophilic functional group such as an amino group, amide group, carboxyl group or hydroxyl group, organic fine particles subjected to internal three-dimensional crosslinking, and emulsions, latexes, colloid solutions and suspensions of natural and synthetic waxes such as paraffin wax, polyethylene wax and carnauba wax, may also be added to the inks.

In the present invention, the resin component described above is preferably contained within a range of from 0.001 to 10% by weight based on the total weight of the ink. If the content is lower than 0.001% by weight, the improving effect on rub-off resistance may be made small because the formation of a film by such a resin becomes insufficient. If the content is higher than 10% by weight, the viscosity of the resulting ink becomes extremely high, so that normal ejection of ink droplets from a recording head may become difficult in some cases. The preferable content of the resin component is within a range of from 0.005 to 5% by weight.

Pigments used in the pigment inks according to the present invention are general inorganic pigments and organic pigments. For example, as the inorganic pigments, carbon black produced in accordance with a publicly known process such as the furnace process or channel process may be used in addition to titanium oxide and iron oxide.

As the organic pigments, may be used azo pigments (including azo lakes, insoluble azo pigments, condensed azo pigments, chelated azo pigments, etc.), polycyclic pigments (for example, phthalocyanine pigments, perylene pigments, perinone pigments, thioindigo pigments, isoindolinone pigments, quinophthalone pigments, etc.), nitro pigments, nitroso pigments, aniline black and the like.

As a dispersing agent used for dispersing these pigments, may be used an ordinary water-soluble resin or water-soluble surfactant. Specific examples of the water-soluble resin include block copolymers and random copolymers composed of at least two components selected from among styrene, styrene derivatives, vinylnaphthalene derivatives, aliphatic alcohol esters of α,β-ethylenically unsaturated carboxylic acids, acrylic acid and derivatives thereof, maleic acid and derivatives thereof, itaconic acid and derivatives thereof, and fumaric acid and derivatives thereof, and salt of these copolymers.

These water-soluble resins are alkali-soluble resins which dissolve in an aqueous solution of a base, and are particularly preferred in that the viscosity of the resulting dispersion can be made lower in the case where they are used in inks for ink-jet, and dispersing operation also becomes easier.

Specific examples of the water-soluble surfactant usable as the dispersing agent in the present invention include the following surfactants.

Examples of anionic surfactants include higher fatty acid salts, alkyl sulfates, alkyl ether sulfates, alkyl ester sulfates, alkyl aryl ether sulfates, alkylsulfonates, sulfosuccinates, alkylallyl- and alkylnaphthalenesulfonates, alkylphosphates, polyoxyethylene alkyl ether phosphate salts and alkyl allyl ether phosphates.

Examples of cationic surfactants include alkylamine salts, dialkylamine salts, tetraalkylammonium salts, benzalkonium salts, alkylpyridinium salts and imidazolinium salts.

Examples of amphoteric surfactants include dimethylalkyllaurylbetaine, alkylglycine, alkyl-di(aminoethyl)glycine and imidazolinium betaine.

Examples of nonionic surfactants include polyoxyethylene alkyl ethers, polyoxyethylene alkyl allyl ethers, polyoxyethylene polyoxypropylene glycol, glycerol esters, sorbitan esters, sucrose esters, polyoxyethylene ethers of glycerol esters, polyoxyethylene ethers of sorbitan esters, polyoxyethylene ethers of sorbitol esters, fatty acid alkanolamides, polyoxyethylene fatty acid amides, amine oxides and polyoxyethylene alkylamines.

The water-based pigment inks of plural colors according to the present invention comprise the pigment and dispersing agent described above and an aqueous medium for dispersing them therein. A preferable aqueous medium used in this case is water or a mixed solvent of water and a water-soluble organic solvent. The content of water in the inks used in the present invention is within a range of generally from 20 to 90% by weight, preferably from 30 to 70% by weight.

Water-soluble organic solvents usable in combination with water in the present invention may be divided into the following three groups. Namely, they are solvents of the first group, which are high in moisture retention, difficult to be evaporated and excellent in hydrophilicity; solvents of the second group, which have organicity and good wettability with a hydrophilic surface and also have dryability by evaporation; and solvents of the third group, which have moderate wettability and a low viscosity. In the present invention, the solvent may be suitably selected from among these solvents as necessary for the end application intended.

Solvents belonging to the first group include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerol monoallyl ether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylol-propane, trimethylolethane, neopentylglycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, propylene glycol monoethyl ether, dipropylene glycol monomethyl ether, dipropylene glycol monoethyl ether, β-dihydroxy-ethylurea, urea, acetonylacetone, pentaerythritol and 1,4-cyclohexanediol.

Solvents belonging to the second group include hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, propylene glycol monoethyl ether, propylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, dipropylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol and 2,5-hexanediol.

Solvents belonging to the third group include ethanol, n-propanol, 2-propanol, 1-methoxy-2-propanol, furfuryl alcohol and tetrahydrofurfuryl alcohol.

The total amount of such water-soluble organic solvents as described above is within a range of generally from 5 to 40% by weight based on the total weight of the ink.

To the water-based pigments inks of plural colors according to the present invention, a surfactant, a pH adjuster, a preservative and the like may be added in addition to the above-described components, as needed.

The water-based pigments inks of plural colors according to the present invention are prepared by dispersing the materials described above by a dispersing machine. As the dispersing machine used at this time, any dispersing machine may be used so far as it is routinely used. Specific examples thereof include dispersing machines such as ball mills, roll mils and sand mills. Of these mills, a high-speed sand mill may preferably be used. For example, Super Mill, Sand Grinder, Beads Mill, Agitator Mill, Grain Mill, Dyno Mill, Pearl Mill and Coball Mill (all, trade names) may be preferably used.

As a method for providing a dispersion of a pigment having a desired particle diameter distribution in the present invention, may be used the following method. For example, a method in which the size of grinding media used in a dispersing machine is made small, the packing rate of the grinding media is made high, the grinding treatment time is elongated, or the grinding speed is slowed, or a technique that classification by a filter, centrifugal separator or the like is conducted after grinding may be used. It goes without saying that these techniques may be used in combination.

The present invention will hereinafter be described more specifically by the following Examples. However, the present invention is not limited to these examples. Incidentally, proportions and all designations of "part(s)" or "%" as will be used in the following examples are expressed by weight unless expressly noted.

PREPARATION EXAMPLE OF ALUMINA HYDRATE

Aluminum dodecoxide prepared in accordance with the process described in U.S. Pat. No. 4,242,271 was hydrolyzed in accordance with the process described in U.S. Pat. No. 4,202,670 to obtain an alumina slurry. This alumina slurry was diluted with water until the solids content of alumina hydrate reached 7.9%. The pH of the diluted slurry was measured and found to be 9.5. The pH of the diluted slurry was adjusted to 6.6 with a 3.9% nitric acid solution. Thereafter, the thus-treated diluted slurry was heated and aged at 125° C. for 6 hours in an autoclave. After the aging, it was spray-dried at 75° C. to obtain alumina hydrate in the form of particles.

The BET specific surface area and pore volume of the alumina hydrate particles were 220.2 m²/g and 0.68 ml/g, respectively. The pore volume was measured by means of an apparatus (Autosorb I, trade name, manufactured by Quanthachrome Co.), which measures the amount of nitrogen adsorbed or desorbed, after the alumina hydrate particles were subjected to a deration treatment at 120° C. for 24 hours. The BET specific surface area was calculated in accordance with the method of Brunauer, et al. (J. Am. Chem. Soc., 60, 309 (1938)).

[Recording Medium 1]

The alumina hydrate obtained in the Preparation Examples of alumina hydrate described above was dispersed in ion-exchanged water so as to give a solids content of 20% to obtain an aqueous dispersion. The aqueous dispersion of the alumina hydrate was mixed with polyvinyl alcohol ("PVA-124", trade name, product of Kuraray Co., Ltd.) so as to give a mass ratio of 6:1 (solids content in the aqueous dispersion of the alumina hydrate/solids content in PVA-12) in terms of solids, thereby obtaining a coating formulation.

The coating formulation was applied at a coating rate of 25 m/min by a die coater onto a white polyester film ("Lumirror X-21", trade name, product of Toray Industries, Inc., thickness: 100 μm) so as to give a dry film thickness of 30 μm, and then dried at 110° C. An ink-receiving layer having a pore volume of 0.7 ml/g and a BET specific surface area of 230 m²/g was formed in the above-described manner to obtain Recording Medium 1 according to the present invention.

[Recording Medium 2]

Preparation was conducted in the same manner as in the preparation of Recording Medium 1 except that the aqueous dispersion of the alumina hydrate was mixed with an anionic polyvinyl acetate resin emulsion ("Syvinol AS-550", trade name) so as to give a mass ratio (solids content in the aqueous dispersion of the alumina hydrate/solids content in Syvinol AS-550) of 11:1, resulting in Recording Medium 2 having an ink-receiving layer having a pore volume of 1.7 ml/g and a BET specific surface area of 280 m²/g.

[Recording Medium 3]

Preparation was conducted in the same manner as in the preparation of Recording Medium 1 except that the aqueous dispersion of the alumina hydrate was mixed with an anionic polyvinyl acetate resin emulsion ("Syvinol AS-550", trade name) so as to give a mass ratio (solids content in the aqueous dispersion of the alumina hydrate/solids content in Syvinol AS-550) of 1:2, resulting in Recording Medium 3 having an ink-receiving layer having a pore volume of 0.06 ml/g and a BET specific surface area of 100 m²/g.

[Yellow Ink 1]

A styrene-acrylic acid copolymer (mass average molecular weight: about 7,000; acid value: about 200), potassium hydroxide in a prescribed amount required to neutralize the copolymer, and water were mixed with one another, and the mixture was stirred while the temperature of the mixture was kept at about 60° C., thereby preparing a 10% aqueous solution of the styrene-acrylic acid copolymer. The aqueous solution of the styrene-acrylic acid copolymer thus prepared was used as a dispersing agent to prepare a yellow pigment dispersion having the following composition.

| | |
|---|---|
| Aqueous solution (10%) of styrene-acrylic acid copolymer | 20 parts |
| C.I. Pigment Yellow 93 | 10 parts |
| Glycerol | 20 parts |
| Diethylene glycol | 20 parts |
| Triethylene glycol | 10 parts |
| Water | 20 parts. |

These materials were charged into a batch type vertical sand mill, and glass beads having a diameter of 1 mm were charged as grinding media to conduct a dispersing treatment for 3 hours while cooling with water. The resultant yellow pigment dispersion was subjected to a first centrifugal treatment (12,000 rpm, 20 minutes) to remove coarse particles. The dispersion was then diluted at ½ with water to prepare an ink. This ink was subjected further to a second centrifugal treatment (12,000 rpm, 20 minutes) to remove coarse particles. A surfactant (NIKKOL BO-10TX, trade name) was then added to this ink so as to give a concentration of 2% proportion to pigment: 40%) in terms of a pure product. The resultant mixture was stirred to prepare an ink having the predetermined composition. The ink was finally subjected again to a centrifugal treatment (12,000 rpm, 20 minutes) to remove coarse particles, thereby obtaining Yellow Ink 1 according to the present invention.

[Magenta Ink 1]

An aqueous solution of a styrene-acrylic acid copolymer prepared in the same manner in the preparation of Yellow Ink 1 was used as a dispersing agent to prepare a magenta pigment dispersion having the following composition.

| | |
|---|---|
| Aqueous solution (10%) of styrene-acrylic acid copolymer | 20 parts |
| C.I. Pigment Red 122 | 10 parts |
| Glycerol | 20 parts |
| Diethylene glycol | 20 parts |
| Triethylene glycol | 10 parts |
| Isopropyl alcohol | 5 parts |
| Water | 15 parts. |

These materials were charged into a batch type vertical sand mill, and glass beads having a diameter of 1 mm were charged as grinding media to conduct a dispersing treatment for 3 hours while cooling with water.

The resultant magenta pigment dispersion was subjected to a first centrifugal treatment (12,000 rpm, 20 minutes) to remove coarse particles. The dispersion was then diluted at ½ with water to prepare an ink. This ink was subjected further to a second centrifugal treatment (12,000 rpm, 20 minutes) to remove coarse particles. A surfactant (NIKKOL BO-10TX, trade name) was then added to this ink so as to give a concentration of 2% (proportion to pigment: 40%) in terms of a pure product. The resultant mixture was stirred to prepare an ink having the predetermined composition. The ink was finally subjected again to a centrifugal treatment (12,000 rpm, 20 minutes) to remove coarse particles, thereby obtaining Magenta Ink 1 according to the present invention.

[Cyan Ink 1]

An aqueous solution of a styrene-acrylic acid copolymer prepared in the same manner in the preparation of Yellow Ink 1 was used as a dispersing agent to prepare a cyan pigment dispersion having the following composition.

| | |
|---|---|
| Aqueous solution (10%) of styrene-acrylic acid copolymer | 20 parts |
| C.I. Pigment Blue 15:3 | 10 parts |
| Glycerol | 20 parts |
| Diethylene glycol | 20 parts |
| Triethylene glycol | 10 parts |
| Isopropyl alcohol | 5 parts |
| Water | 15 parts. |

These materials were charged into a batch type vertical sand mill, and glass beads having a diameter of 1 mm were charged as grinding media to conduct a dispersing treatment for 3 hours while cooling with water.

The resultant cyan pigment dispersion was subjected to a first centrifugal treatment (12,000 rpm, 20 minutes) to remove coarse particles. The dispersion was then diluted at ½ with water to prepare an ink. This ink was subjected further to a second centrifugal treatment (12,000 rpm, 20 minutes) to remove coarse particles. A surfactant (NIKKOL BO-10TX, trade name) was then added to this ink so as to give a concentration of 2% (proportion to pigment: 40%) in terms of a pure product. The resultant mixture was stirred to prepare an ink having the predetermined composition. The ink was finally subjected again to a centrifugal treatment (12,000 rpm, 20 minutes) to remove coarse particles, thereby obtaining Cyan Ink 1 according to the present invention.

[Yellow Ink 2]

The triethanolamine salt of PHOSPHANOL RS-710 (trade name, product of Toho Chemical Industry Co., Ltd.), which is a nonionic anionic surfactant, was used as a dispersing agent to prepare a yellow pigment dispersion having the following composition.

| | |
|---|---|
| Triethanolamine salt (10% aqueous solution) of PHOSPHANOL RS-710 | 20 parts |
| C.I. Pigment Yellow 93 | 10 parts |
| Glycerol | 20 parts |
| Diethylene glycol | 20 parts |
| Triethylene glycol | 10 parts |
| Water | 20 parts. |

These materials were charged into a batch type vertical sand mill, and glass beads having a diameter of 1 mm were charged as grinding media to conduct a dispersing treatment for 4 hours while cooling with water.

The resultant yellow pigment dispersion was subjected to a centrifugal treatment (12,000 rpm, 20 minutes) to remove coarse particles. The dispersion was then diluted at ½ with water to prepare an ink. The 10% aqueous solution of the styrene-acrylic acid copolymer prepared in the preparation of Yellow Ink 1 to this ink so as to give a concentration of 3% in terms of a pure resin. The resultant mixture was stirred to prepare an ink having the predetermined composition. The ink was subjected further to a centrifugal treatment (12,000 rpm, 20 minutes) to remove coarse particles, thereby obtaining Yellow Ink 2 according to the present invention.

[Magenta Ink 2]

Preparation was conducted in the same manner as In the preparation of Yellow Ink 2 except that C.I. Pigment Red 122 was used in place of C.I. Pigment Yellow 93, thereby obtaining Magenta Ink 2 according to the present invention.

[Cyan Ink 2]

Preparation was conducted in the same manner as in the preparation of Yellow Ink 2 except that C.I. Pigment Blue 15:3 was used in place of C.I. Pigment Yellow 93, thereby obtaining Cyan Ink 2 according to the present invention.

[Yellow Ink 3]

Preparation was conducted in the same manner as in the preparation of Yellow Ink 2 except that no 10% aqueous solution of the styrene-acrylic acid copolymer was added, thereby obtaining Yellow Ink 3.

[Magenta Ink 3]

Preparation was conducted in the same manner as in the preparation of Magenta Ink 2 except that no 10% aqueous solution of the styrene-acrylic acid copolymer was added, thereby obtaining Magenta Ink 3.

[Cyan Ink 3]

Cyan Ink 3 was obtained under the same conditions as in the preparation of Cyan Ink 1 except that the following respects were changed.

Namely, the dispersing time was shortened to 2 hours, and the time of the first and second centrifugal treatments was shortened to 10 minutes.

[Yellow Ink 4]

Yellow Ink 4 was obtained under the same conditions as in the preparation of Yellow Ink 1 except that the following respects were changed. Namely, the dispersing time was shortened to 2 hours, and the time of the first and second centrifugal treatments was shortened to 10 minutes.

[Magenta Ink 4]

Magenta Ink 4 was obtained in the same manner as in the preparation of Magenta Ink 1 except that no final centrifugal treatment was conducted.

[Cyan Ink 4]

Cyan Ink 4 was obtained in the same manner as in the preparation of Cyan Ink 1 except that no final centrifugal treatment was conducted.

The measured values and calculated values as to the particle diameters of the above-prepared respective inks are shown in Table 1.

printed by the above-described method were lightly touched with a finger to examine the ink absorbency.

A: No ink stuck to the finger;
B: Some ink stuck to the finger.

(2) Beading:

The occurrence of beading at the solid printed areas printed by the above-described method was visually observed.

A: No occurrence of beading was observed;
C: Occurrence of beading was observed.

(3) Rub-off Resistance:

After the images printed by the above-described method were left to stand for several hours, the solid printed areas were rubbed with a finger or lightly scratched with a nail to examine the rub-off resistance.

A: None of sticking to the finger, staining of the image and color fading occurred;
C: Sticking to the finger, staining of the image and/or color fading occurred.

TABLE 1

| | | Yellow Ink | | | | Magenta Ink | | | | Cyan Ink | | | |
|---|---|---|---|---|---|---|---|---|---|---|---|---|---|
| | | 1 | 2 | 3 | 4 | 1 | 2 | 3 | 4 | 1 | 2 | 3 | 4 |
| Particles having a diameter of 10–500 nm | Maximum particle diameter (nm) | 322.4 | 367.2 | 376.1 | 625.5 | 388.4 | 401.7 | 425.3 | 482.2 | 271.7 | 298.1 | 583.9 | 461.2 |
| | Minimum particle diameter (nm) | 22.3 | 26.4 | 27.9 | 31.1 | 25.9 | 27.3 | 29.7 | 28.3 | 18.1 | 20.6 | 27.8 | 25.3 |
| Proportion of particles having a diameter of 300–500 nm % | | 14.8 | 15.1 | 18.6 | 26.1 | 18.8 | 20.3 | 22.6 | 58.6 | 8.5 | 11.2 | 25.3 | 46.2 |

Incidentally, the particle diameters of the pigment particles were measured by means of an electrophoretic light scattering photometer ELS-800 manufactured by Otsuka Denshi K.K.

[Evaluation Methods and Results]

Bubble-jet cartridges for yellow, magenta and cyan inks having 128 nozzles at 360 dpi were charged with the inks of the respective colors used in the Examples and Comparative Examples and installed in a BJ-W 7000 printer (manufactured by Canon Inc.). A full-color image formed by the yellow, magenta and cyan colors and mixed colors thereof was recorded on the recording medium used in each of the Examples and Comparative Examples to evaluate the inks and recording media as to the following items paying attention to the mixed color portions in particular.

(1) Ink Absorbency:

The respective single-color solid printed areas of yellow, magenta and cyan and mixed-color solid printed areas (4) Water Fastness:

After the images printed by the above-described method were left to stand for 24 hours, the image portions were immersed 3 minutes in running water and then air-dried to examine the conditions of the image portions.

A: No change was observed compared with the condition before the immersion;
C: Destruction, separation or dissolution of the ink-receiving layer, or color fading occurred.

(5) Saturation of Image:

The respective single-color solid printed areas of yellow, magenta and cyan and mixed-color solid printed areas printed by the above-described method were visually evaluated as to coloring properties.

A: Having sufficient saturation;
B: The color was dull-looking and insufficient in saturation.

The evaluation results are shown in Table 2.

TABLE 2

| | Recording Medium | Ink Set | Ink Absorbency | Beading | Rub-off Resistance | Water Fastness | Saturation of Image |
|---|---|---|---|---|---|---|---|
| Ex. 1 | 1 | Yellow Ink 1 Magenta Ink 1 Cyan Ink 1 | A | A | A | A | A |
| Ex. 2 | 1 | Yellow Ink 2 Magenta Ink 2 Cyan Ink 2 | A | A | A | A | A |

TABLE 2-continued

|  | Recording Medium | Ink Set | Ink Absorbency | Beading | Rub-off Resistance | Water Fastness | Saturation of Image |
|---|---|---|---|---|---|---|---|
| Comp. Ex. 1 | 2 | Yellow Ink 1<br>Magenta Ink 1<br>Cyan Ink 1 | A | A | A | A | C |
| Comp. Ex. 2 | 3 | Yellow Ink 1<br>Magenta Ink 1<br>Cyan Ink 1 | C | C | C | A | A |
| Comp. Ex. 3 | 1 | Yellow Ink 3<br>Magenta Ink 3<br>Cyan Ink 1 | A | A | C | A | A |
| Comp. Ex. 4 | 1 | Yellow Ink 4<br>Magenta Ink 2<br>Cyan Ink 3 | A | A | C | A | A |
| Comp. Ex. 5 | 1 | Yellow Ink 2<br>Magenta Ink 4<br>Cyan Ink 4 | A | A | C | A | A |

According to the present invention, there can be provided an ink-jet recording system which employs pigment inks and a recording medium, by which good coloring ability and ink absorbency are achieved when a high-definition full-color image is formed with pigment inks of plural colors, and moreover an ink-jet color recorded article improved in rub-off resistance and water fastness at an image portion thereof is provided.

What is claimed is:

1. An ink-jet recording system comprising:
   a recording medium;
   an ink-jet printing apparatus comprising ink containers in which a plurality of pigment inks are contained, and ink-jet heads for ejecting the respective pigment inks towards the recording medium,
   wherein the recording medium is provided with an ink-receiving layer having porous structure on a base material, the ink-receiving layer comprising alumina hydrate particles and resinous binder, and having a pore volume of 0.1 to 1.0 ml/g;
   wherein each of the pigment inks comprises pigment particles and a resin in an aqueous medium, and comprises 30 to 70% water by weight based on the total weight of the ink, and in each of the pigment inks, the diameter of the pigment particles falls within a range of from 10 to 500 nm, and the proportion of the pigment particles having a diameter of 300 to 500 nm based on the total number of pigment particles in the ink is at most 30%; and
   wherein the ink-receiving layer has a thickness of at least 15 µm.

2. The ink-jet recording system according to claim 1, wherein the ink-receiving layer has a BET specific surface area within a range of from 20 to 450 m²/g.

3. The ink-jet recording system according to claim 1, wherein the content of the resin in the pigment ink is within a range of from 0.001 to 10% by weight based on the total weight of the ink.

4. The ink-jet recording system according to any one of claims 1 to 3, wherein inks of plural colors of at least cyan, magenta and yellow are used as the pigment inks.

5. An ink-jet recording method comprising the steps of:
   (i) providing a recording medium provided with an ink-receiving layer having porous structure on a base material, the ink receiving layer comprising alumina hydrate particles and resinous binder, and having a pore volume of 0.1 to 1.0 ml/g and a thickness of at least 15 µm;
   (ii) providing an ink-jet recording apparatus comprising ink containers in which a plurality of pigment inks are contained, and ink-jet heads for ejecting the respective pigment inks towards the recording medium, each of the pigment inks comprising a pigment and a resin in an aqueous medium and comprising 30 to 70% water by weight based on the total weight of the ink, and in each of the pigment inks, the particle diameter of the pigment falling within a range of from 10 to 500 nm, and the proportion of the pigment particles having a particle diameter of 300 to 500 nm based on the total number of the pigment particles in the ink being at most 30%; and
   (iii) applying at least one of the pigment inks to the recording medium.

6. The ink-jet recording method according to claim 5, wherein the ink-receiving layer has a BET specific surface area within a range of from 20 to 450 m²/g.

7. The ink-jet recording method according to claim 5, wherein the content of the resin in the pigment ink is within a range of from 0.001 to 10% by weight based on the total weight of the ink.

8. The ink-jet recording method according to any one of claims 5 to 7, wherein inks of plural colors of at least cyan, magenta and yellow are used as the pigment inks.

9. The ink-jet recording method according to claim 8, wherein step (iii) comprises the sub-steps of applying the cyan ink, magenta ink and yellow ink respectively and forming a full-color image on the recording medium.

* * * * *

UNITED STATES PATENT AND TRADEMARK OFFICE
CERTIFICATE OF CORRECTION

PATENT NO.     : 6,773,101 B2
DATED          : August 10, 2004
INVENTOR(S)    : Shinichi Tochihara et al.

It is certified that error appears in the above-identified patent and that said Letters Patent is hereby corrected as shown below:

Column 2,
Line 29, "like-are" should read -- like are --.

Column 3,
Line 26, "an" should read -- a --.

Column 4,
Line 66, "of the" should read -- of either of the --.
Line 67, "each range," should read -- ranges, --.

Column 6,
Line 24, "30%based" should read -- 30% based --.

Column 7,
Lines 41 and 49, "may" should read -- there may --.

Column 9,
Lines 16 and 20, "pigments" should read -- pigment --.

Column 10,
Line 1, "dearation" should read -- deaeration --.

Column 11,
Line 8, "proportion" should read -- (proportion --.

Column 12,
Line 37, "Ink 1" should read -- Ink 1 was added --.

UNITED STATES PATENT AND TRADEMARK OFFICE
CERTIFICATE OF CORRECTION

PATENT NO. : 6,773,101 B2
DATED : August 10, 2004
INVENTOR(S) : Shinichi Tochihara et al.

It is certified that error appears in the above-identified patent and that said Letters Patent is hereby corrected as shown below:

Column 16,
Line 31, "hinder" should read -- binder --.

Signed and Sealed this

Thirtieth Day of November, 2004

JON W. DUDAS
*Director of the United States Patent and Trademark Office*